(12) United States Patent
Malkin

(10) Patent No.: US 7,734,882 B2
(45) Date of Patent: Jun. 8, 2010

(54) GENERATING DIGEST FOR BLOCK RANGE VIA ISCSI

(75) Inventor: Kirill Malkin, Morris Plains, NJ (US)

(73) Assignee: RELDATA, Inc., Parsippany, NJ (US)

( * ) Notice: Subject to any disclaimer, the term of this patent is extended or adjusted under 35 U.S.C. 154(b) by 558 days.

(21) Appl. No.: 11/470,544

(22) Filed: Sep. 6, 2006

(65) Prior Publication Data

US 2007/0088802 A1  Apr. 19, 2007

Related U.S. Application Data

(60) Provisional application No. 60/714,420, filed on Sep. 6, 2005.

(51) Int. Cl.
*G06F 12/00* (2006.01)
*G06F 13/00* (2006.01)
*G06F 13/28* (2006.01)
*G06F 7/00* (2006.01)
*G06F 17/00* (2006.01)

(52) U.S. Cl. ............... 711/161; 711/156; 711/162; 707/690; 707/697

(58) Field of Classification Search ............ 711/161
See application file for complete search history.

(56) References Cited

U.S. PATENT DOCUMENTS 6,085,298 A * 7/2000 Ohran .................. 711/162

2005/0027955 A1 * 2/2005 Lam et al. ............ 711/162
2005/0210098 A1 * 9/2005 Nakamichi et al. ...... 709/203
2006/0047904 A1 * 3/2006 Rohde et al. ............ 711/114

OTHER PUBLICATIONS

Andrew Tanenbaum. Structured Computer Organization. 1984. Prentice Hall Inc. pp. 10-12.*
"Information technology—SCSI Architecture Model—2 (SAM-2)," T10 Project 1157-D, Revision 24, Sep. 12, 2002, Ref. No. ISO/IEC 14776-412: 200x, ANSI INCITS.***:200x.
"Information technology—SCSI Primary Commands—4 (SPC-4)," Project T10/1731-D, Revision 1a, Sep. 5, 2005, Ref. No. ISO/IEC 14776-314 : 200x, ANSI INCITS.***:200x.

* cited by examiner

*Primary Examiner*—Christian P Chace
*Assistant Examiner*—Ryan Bertram
(74) *Attorney, Agent, or Firm*—Wayne F. Reinke, Esq.; Heslin Rothenberg Farley & Mesiti P.C.

(57) ABSTRACT

SCSI commands are used over IP (iSCSI) to trigger digest calculations of block span ranges. The parameters of the digest-calculation command include the command itself a block range, and the digest-calculation method to be used. A related combined command compares the digest-calculation result with a preexisting digest-calculation result. The parameters of the combined command include the parameters of the digest-calculation command, and the preexisting digest calculation result. Another command initializes a block range.

10 Claims, 1 Drawing Sheet

GENERATING DIGEST FOR BLOCK RANGE VIA ISCSI

CROSS-REFERENCE TO RELATED APPLICATIONS

This application claims priority under 35 U.S.C. §119 to U.S. Provisional Application No. 60/714,420, filed Sep. 6, 2005, which is herein incorporated by reference in its entirety.

This application contains subject matter which is related to the subject matter of the following applications, each of which is assigned to the same assignee as this application and filed on the same day as this application. Each of the below listed applications is hereby incorporated herein by reference in its entirety:

U.S. patent application Ser. No. 11/470,551, filed Sep. 6, 2006, by Kirill Malkin, entitled "STORAGE RESOURCE SCAN"

U.S. patent application Ser. No. 11/470,550, filed Sep. 6, 2006, by Malkin et al., entitled "REDUNDANT APPLIANCE CONFIGURATION REPOSITORY IN STANDARD HIERARCHICAL FORMAT"

U.S. patent application Ser. No. 11/470,548, filed Sep. 6, 2006, by Malkin et al., entitled "LIGHTWEIGHT MANAGEMENT AND HIGH AVAILABILITY CONTROLLER"

U.S. patent application Ser. No. 11/470,545, filed Sep. 6, 2006, by Kirill Malkin, entitled "BLOCK SNAPSHOTS OF Iscsi"

U.S. patent application Ser. No. 11/470,542, files Sep. 6, 2006, by Kirill Malkin, entitled "INCREMENTAL REPLICATION USING SNAPSHOTS"

U.S. patent application Ser. No. 11/470,537, filed Sep. 6, 2006, by Kirill Malkin, entitled "PERFORMANCE IMPROVEMENT FOR BLOCK SPAN REPLICATION"

U.S. patent application Ser. No. 11/470,539, filed Sep. 6, 2006, by Dmitry Fomichev, entitled "REUSING TASK OBJECT AND RESOURCES"

BACKGROUND OF THE INVENTION

1. Technical Field

The present invention generally relates to digest calculations. More particularly, the present invention relates to the use of iSCSI to send digest-calculation commands.

2. Background Information

In the area of network storage, it is sometimes necessary or desirable to compare some or all of the contents of storage resources. However, it is not practical to send all of the data across a communications link, which itself may be slow, or even if not, the resulting performance decrease may be unacceptable. Thus, checksum or "digest" calculations are used as a means for fast comparison with a reasonable level of accuracy.

In the past, triggering of such digest calculations has been accomplished by custom network protocols, not necessarily compatible with standard transport protocols, and typically requiring additional handling by the network infrastructure team.

Thus, a need exists for a simpler way to trigger digest calculations that are compatible with standard transport protocols.

SUMMARY OF THE INVENTION

Briefly, the present invention satisfies the need for a simpler way to trigger digest calculations that is compatible with standard transport protocols by providing a command to trigger the same.

In accordance with the above, it is an object of the present invention to provide a way to trigger digest-calculation commands.

The present invention provides, in a first aspect, a method of triggering a digest calculation for at least a portion of a block storage resource coupled to a network. The method comprises generating a digest calculation command for the at least a portion of a block storage resource, receiving the command over the network via a standard network transport protocol, and performing a digest calculation on the at least a portion of the block storage resource in response to the receiving.

The present invention provides, in a second aspect, a command block for triggering a digest calculation via a standard network transport protocol for at least a portion of a block storage resource on a network, comprising a digest calculation command and an indication of a block span on which to perform the digest calculation.

The present invention provides, in a third aspect, a command block for initializing a block span of a block storage resource on a network, comprising an initialization command, an indication of the block span, and any data needed for the initialization.

The present invention provides, in a fourth aspect, a method of comparing contents of a first span of blocks of a first block storage resource and a second span of blocks of a second block storage resource, the first block storage resource and the second block storage resource being coupled via a network. The method comprises generating by a requester coupled to the network, a digest calculation command for each of the first span and the second span. The method further comprises sending the commands over the network via a standard network transport protocol from the requester to a first controller for the first block storage resource and a second controller for the second block resource, performing by the first controller and the second controller the commands to produce first results and second results, respectively, and returning the first results and the second results to the requester.

The present invention provides, in a fifth aspect, a method of comparing contents of a first span of blocks of a first block storage resource and a second span of blocks of a second block storage resource, the first block storage resource and the second block storage resource being coupled via a network. The method comprises generating by a requester coupled to the network, a digest calculation command for one of the first span and the second span, and sending the digest calculation command over the network via a standard network transport protocol from the requestor to one of a first controller for the first block storage resource and a second controller for the second block storage resource. The method further comprises performing by the one of the first controller and the second controller the digest calculation command to produce initial calculation results, returning the initial calculation results to the requester, generating by the requester a combined command to perform a digest calculation for the other of the first span and the second span, and compare the results of the digest calculation with the initial calculation results. The method further comprises sending the combined command over the network via the standard network transport protocol from the requester to the other of the first controller and the second controller, performing by the other of the first controller and the second controller the combined command to produce comparison results, and returning the comparison results to the requestor.

The present invention also includes systems and program products corresponding to the methods of the first, fourth and fifth aspects.

These, and other objects, features and advantages of this invention will become apparent from the following detailed description of the various aspects of the invention taken in conjunction with the accompanying drawings.

DETAILED DESCRIPTION OF THE INVENTION

The present invention takes advantage of the SCSI Architecture Model-2 Specification (SAM-2), which allows equipment vendors to define their own SCSI commands. See the SAM-2 document at page 57, SAM-2 being incorporated by reference herein in its entirety. See also the SCSI Primary Commands-4 (SPC-4) document (Working Draft Revision 1a, Sep. 5, 2005 at page 27), which is also incorporated by reference herein in its entirety. A standard transport protocol, iSCSI, is used to send a non-standard, i.e., vendor-specific, command. In one example, a vendor-specific iSCSI command that will trigger a digest calculation is used to trigger a digest calculation. In other examples, a digest is triggered and the results compared to preexisting result, and a range of storage blocks is initialized.

Figure 1:
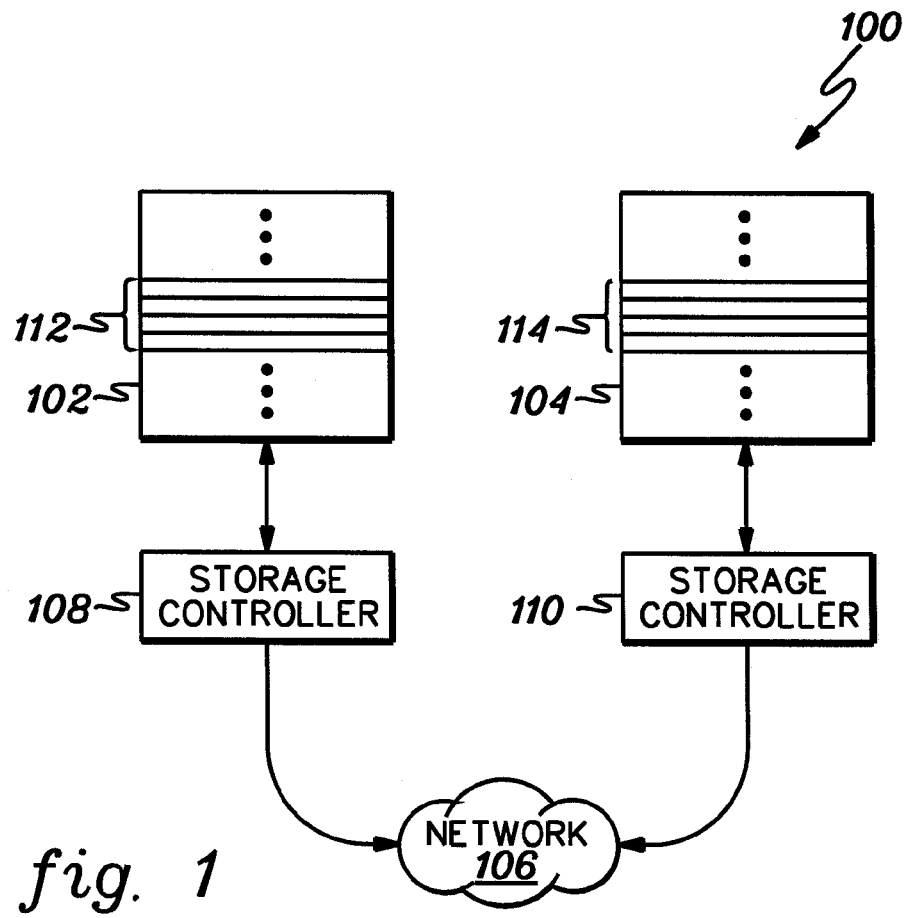
FIG. 1 is a block diagram of one example of a computing environment implementing the present invention.

FIG. 1 depicts one example of a computing environment implementing the present invention. The computing environment comprises a network 100, for example, a local area network or wide area network. Assume for the present example that the network is a wide area network, using iSCSI as a network data transport protocol. Two network storage resources 102 and 104 provide storage to clients (not shown) on the remainder 106 of the network. The network storage resources are, for example, hard disk drives or other block storage devices. Assume that the network storage resources are remote from each other. Consequently, each is associated with a storage controller, 108 and 110, respectively. The storage controllers control and manage network access to the storage resources.

As one skilled in the art will know, a block storage resource is a random-access storage resource that has data organized in equal-sized blocks, typically 512 bytes each. Each block can be written or read in its entirety, but one can't read or update less than the entire block. The blocks are numbered from 0 to the maximum number of blocks of the resource. Blocks are referenced by their numbers, and the access time for any block number is fairly similar across the entire resource. Blocks can also be grouped into equal size "chunks" of blocks. Hard disks, as well as compact flash and USB sticks, are examples of block storage resources.

Block storage resources can be physical or virtual. A physical storage resource is a physical device, such as a hard disk or a flash card, that has a fixed number of blocks that is defined during manufacturing or low-level formatting process, usually at the factory. A virtual block storage resource is a simulated device that re-maps its block numbers into the block numbers of a portion of one or more physical block storage resources. As just two examples, a virtual block storage resource with 2,000 blocks can be mapped to: (1) a single physical block storage resource with 10,000 blocks, starting at block 1,000 and ending at block 2,999; or (2) two physical block storage resources, one with 1,000 blocks and another with 5,000 blocks, starting at block 0 and ending at block 999 of the first resource, then starting at block 3,000 and ending at block 3,999 of the second resource. The examples herein assume the use of virtual block storage resources. However, it will be understood that physical block storage resources could instead be used.

Assume now that a client on the network wants or needs to compare the contents of a range of blocks 112 on storage resource 102 with the contents of a range of blocks 114 on storage resource 104. Instead of transferring all the data from both block ranges to the client for a one-to-one comparison, checksums are used as a reasonable means of confirming that the two block ranges contain different data (checksums are different) or that they may contain the same data (checksums match).

Figure 2:
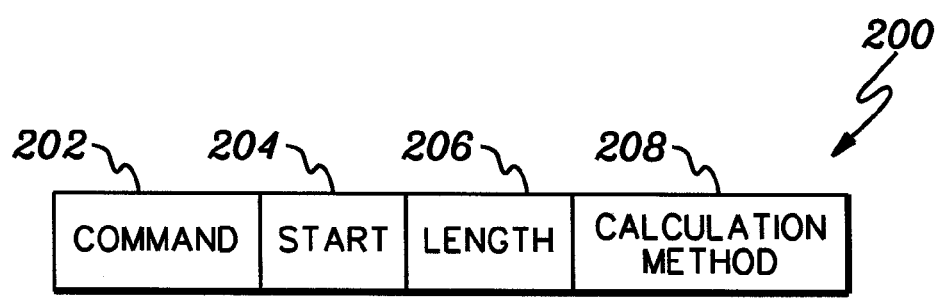
FIG. 2 depicts an example of the parameters for a read style digest-calculation command in accordance with an aspect of the present invention.

In one aspect of the present invention, a method of triggering digest calculations is provided. Digest calculations are not currently supported by standard SCSI commands. However, the SCSI (SAM) allows equipment vendors to define their own SCSI commands, which can of course be used with the iSCSI transport protocol. This is one way to generate a digest-calculation command for use with a standard network transport protocol. Thus, while a command to trigger a digest calculation would be somewhat different from vendor to vendor, the basic parameters of such a command would be the same. FIG. 2 is one example of a simplified block diagram of a read-style digest-calculation command block 200 in accordance with the present invention. The command block comprises the command itself 202, which will vary from vendor to vendor, and an indication of the block range. In particular, the beginning of the range 204 is provided, along with the length 206 of the range. Finally, the command block indicates the calculation method to use 208.

As one skilled in the art will know, there are various checksum calculation methods that could be used. For example, RipeMD-160, SHA1, SHA256, MD4 and MD5 to name a few.

In operation, the command block is created and sent into the iSCSI command stream as a "generic" SCSI command by the client seeking to compare the block ranges of the storage devices, using the same ioctl system call on the same file descriptor as standard read/write commands. As one skilled in the art will know, "ioctl" is a UNIX (LINUX) system API call that handles special device functions.

As one skilled in the art will know, iSCSI stands for Internet SCSI (Small Computer System Interface), an Internet Protocol (IP)-based storage networking standard for linking data storage resources. By carrying SCSI commands over IP networks, iSCSI is used to facilitate data transfers over networks, for example, intranets and wide area networks. When an end user or application sends a request, the operating system generates the appropriate SCSI commands and data request. The SCSI commands are sent on to the SCSI controller, and from there to the SCSI storage device. Because iSCSI is bi-directional, the protocol can also be used to return data in response to the original request.

Returning to the example, the client would send the SCSI command of FIG. 2 to each of the storage controller 108 and 110 using the iSCSI transport protocol. Upon receipt of the commands, the storage controllers would perform the requested digest calculation and return the results via iSCSI transport protocol to the requester. The client would then be able to compare the digest calculations.

An even more efficient way from the point of view of the client to accomplish the comparison is to create an SCSI command that not only performs the digest calculation, but also does the comparison. In this way, the requesting client could send the command described in FIG. 2 to one of the storage controllers, wait for the result, and send the calculation and comparison command to the other storage controller.

Figure 3:
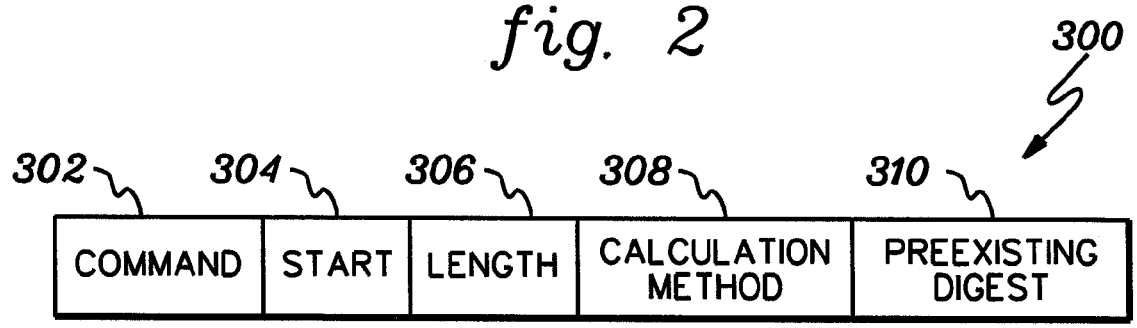
FIG. 3 depicts an example of the parameters for a write style (the function is more accurately described as read-and-compare) digest-calculation command in accordance with another aspect of the present invention.

FIG. 3 is one example of a simplified block diagram of a write-style digest-calculation and compare command block 300 in accordance with another aspect of the present invention. The command block comprises the command itself 302, which will vary from vendor to vendor, and an indication of the block range. In particular, the beginning of the range 304 is provided, along with the length 306 of the range. The command block further indicates the calculation method to use 308, along with the results of a preexisting digest calculation 310. Such a command would result in the storage controller receiving it performing the requested digest calculation on the contents of the indicated block range, and then comparing that calculation to the preexisting calculation received with the command. The controller could then return to the client the results of the comparison in the form of a "match" or "no match" indication.

In still another aspect of the present invention, a vendor-specific iSCSI command can be used to initialize a range of storage blocks, avoiding the need to send initialization data to be written. The blocks can be written with certain patterns of data, such as, for example, all zeros, block number values written until a block is full, or pseudo-random data using an identified "seed". The parameters of such a command would be similar in form to that described with respect to FIG. 2, except that the command itself would be different, and instead of a calculation method, any data needed for the initialization is provided (e.g., a seed).

The above-described computing environment and/or computing units are only offered as examples. The present invention can be incorporated and used with many types of computing units, computers, processors, nodes, systems, work stations and/or environments without departing from the spirit of the present invention. Other types of computing environments can benefit from the present invention and, thus, are considered a part of the present invention.

The present invention can include at least one program storage device readable by a machine, tangibly embodying at least one program of instructions executable by the machine to perform the capabilities of the present invention. The program storage device can be provided separately, or as a part of a computer system.

The figures depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of comparing contents of a first span of blocks of a first block storage resource and a second span of blocks of a second block storage resource, wherein the first block storage resource and the second block storage resource are coupled via a network, the method comprising:
generating by a requestor coupled to the network a digest calculation command for one of the first span and the second span;
sending the digest calculation command over the network via a standard network transport protocol from the requestor to one of a first controller for the first block storage resource and a second controller for the second block storage resource;
performing by the one of the first controller and the second controller the digest calculation command to produce initial calculation results;
returning the initial calculation results to the requestor;
generating by the requestor a combined command to perform a digest calculation for the other of the first span and the second span and compare results of the digest calculation with the initial calculation results;
sending the combined command over the network via the standard network transport protocol from the requestor to the other of the first controller and the second controller;
performing by the other of the first controller and the second controller the combined command to produce comparison results; and
returning the comparison results to the requestor.

2. The method of claim 1, wherein generating the digest calculation command and generating the combined command each comprise generating a vendor-specific SCSI command.

3. The method of claim 2, wherein sending the digest calculation command and sending the combined command each comprise sending over the network via Iscsi.

4. The method of claim 3, wherein returning the initial calculation results and returning the comparison results each comprise returning over the network via Iscsi.

5. A system for comparing contents of block storage resources, the system comprising:
a first block storage resource comprising a first span of storage blocks;
a second block storage resource coupled to the first block storage resource via a network, the second block storage resource comprising a second span of storage blocks;
a first controller coupled to the first block storage resource via the network and configured to:
execute a digest calculation command and send results over the network via Iscsi; and
execute a combined digest calculation and compare command and send results over the network via Iscsi;
a second controller coupled to the second block storage resource via the network and configured to:
execute a digest calculation command and send results over the network via Iscsi; and
execute a combined digest calculation and compare command and send results over the network via Iscsi;
a client coupled to the network and configured to:
generate and send the digest calculation command for one of the first span and the second span over the network via Iscsi to one of the first controller and second controller, respectively; and
generate and send the combined digest calculation and compare command for the other of the first span and the second span over the network via Iscsi to the other of the first controller and the second controller, respectively.

6. The system of claim 5, wherein the digest calculation command comprises a first vendor-specific SCSI command, and wherein the combined digest calculation and compare command comprises a second vendor-specific SCSI command.

7. At least one program storage device readable by a computer tangibly embodying at least one program of computer instructions executable by the computer to perform a method of comparing contents of a first span of blocks of a first block storage resource and a second span of blocks of a second block storage resource, wherein the first block storage resource and the second block storage resource are coupled via a network, the method comprising:

generating by a requestor coupled to the network a digest calculation command for one of the first span and the second span;

sending the digest calculation command over the network via a standard network transport protocol from the requestor to one of a first controller for the first block storage resource and a second controller for the second block storage resource;

performing by the one of the first controller and the second controller the digest calculation command to produce initial calculation results;

returning the initial calculation results to the requestor;

generating by the requestor a combined command to perform a digest calculation for the other of the first span and the second span and compare results of the digest calculation with the initial calculation results;

sending the combined command over the network via the standard network transport protocol from the requestor to the other of the first controller and the second controller;

performing by the other of the first controller and the second controller the combined command to produce comparison results; and returning the comparison results to the requestor.

8. The at least one program storage device of claim 7, wherein generating the digest calculation command and generating the combined command each comprise generating a vendor-specific SCSI command.

9. The at least one program storage device of claim 8, wherein sending the digest calculation command and sending the combined command each comprise sending over the network via Iscsi.

10. The at least one program storage device of claim 9, wherein returning the initial calculation results and returning the comparison results each comprise returning over the network via Iscsi.

* * * * *